T. J. Sloan.

Wood Screw.

No. 626. Reissued Nov. 23, 1858.

Witnesses
Andrew de Lacy
Wm H Bishop

Eagle Screw Co
Jr Wm G Angell, Agt

UNITED STATES PATENT OFFICE.

THE EAGLE SCREW MANUFACTURING COMPANY, OF PROVIDENCE, RHODE ISLAND, ASSIGNEE OF THOMAS J. SLOAN.

IMPROVEMENT IN WOOD-SCREWS.

Specification forming part of Letters Patent No. 4,704, dated August 20, 1846; Reissue No. 107, dated February 22, 1848; Reissue No. 626, dated November 23, 1858.

*To all whom it may concern:*

Be it known that THOMAS J. SLOAN, of the city, county, and State of New York, did invent certain new and useful Improvements in Wood-Screws; and I do hereby declare that the following is a full, clear, and exact description thereof, reference being had to the accompanying drawings, making part of this specification, in which—

Figure 1:
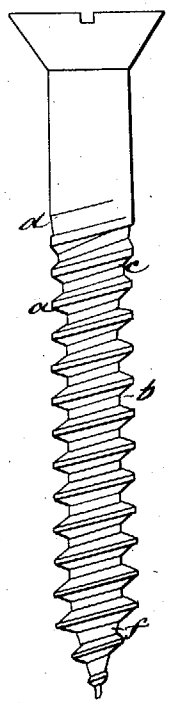
Figure 2:
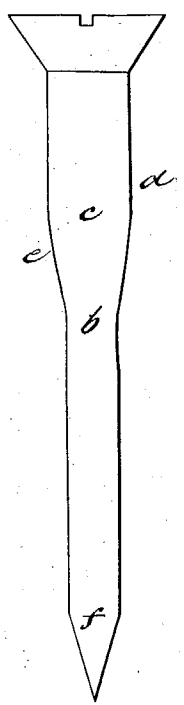

Figure 1 represents a wood-screw of the improved form; and Fig. 2 the form of the core—that is to say, what the form would be if the thread was stripped off.

The same letters indicate like parts in both figures.

Prior to the said invention of the said THOMAS J. SLOAN wood-screws were usually made with the whole length of the threaded part of the same diameter, slightly tapering from end to end, but screws so formed were objectionable for the reason that they could not be inserted in any kind of wood without first boring a hole as large as the core, or nearly so, and even then it was difficult to start them in the proper place on account of the long lip-like projections presented at the end by the thread, which was then of full or nearly full depth. In some instances the extreme end was made of a slightly reduced diameter, such as would be obtained by simply causing the chaser to approach the axis of the screw in cutting the last convolution, so that in a section taken in the plane of the axis of the screw the core between the several convolutions of the thread would approach the axis like a series of steps, each parallel with the axis or nearly so; and although this somewhat avoided the objection above stated, it was still objectionable for the reasons that they could not be brought to a point, and the last convolution, however reduced in diameter, nevertheless still presented a blunt end, with the thread of full or nearly full depth projecting on one side of the core, and because such a screw could not be inserted without first boring a hole, and even then the lip-like projection had a tendency to cut into and follow the grain of the wood; and as the diameter of the core was reduced at each convolution toward the end, and the surface of the core was parallel, or nearly so, with the axis, the under surface of the thread projected from the core more than the upper surface, thereby reducing the strength of the thread, for the greater the projection of the thread from the core the more easily it will be broken, as it is the upper surface of the thread which holds in the wood, and the greater the projection of the upper surface of the thread from the core the greater the hold on the wood, and the less the projection of the under surface from the core the greater the strength of the thread to resist any force which tends to draw or pull the screw out of the wood. Screws so formed were objectionable for another reason: In chasing the thread on the point the metal is severely strained, and the core of the last convolutions, being of a greatly reduced diameter, would be torn or twisted off by the cutter; and if not so broken off, it was very liable to be broken off when encountering a knot or other hard obstruction when applying the screw. Screws were also made, in some instances, pointed conical along the entire threaded part, in the manner of a gimlet-point, the convolutions of the thread being represented by one spiral line, and the bottom of the groove between the threads by another spiral line, and with the depth of thread gradually diminishing toward the point or apex of the core; but in such screws, known as "gimlet-pointed" screws, the convolutions of the thread along the entire length were of gradually less pitch toward the apex of the core—that is, each turn in succession toward the point was shorter, and although when so formed the point could be made to enter the wood readily and at any given point, such screws failed to accomplish the desired purpose, because the travel of a screw when turned depends upon the pitch of the thread, and as the pitch of the thread in such screws was gradually shorter toward the point, it was evident that after the first entrance into the wood, each succeeding convolution of greater pitch, in taking effect, instead of being aided by the preceding convolutions, would be resisted by them, and in consequence the threads of greatest pitch were required to force those of less pitch through the wood.

In the accompanying drawings, Figure 1 represents a wood-screw formed according to the said invention; and Fig. 2 represents the form of the core, or, rather, what would be the form after the threads of the screw, Fig. 1, were cut off.

In the said drawings, *a* represents the thread, formed on the shank *b* in the usual manner. The core is made of a conical form for a short distance, as at *c*, beginning where the thread begins at *d*, and ending where the thread becomes of full depth, the thread along that part gradually increasing in depth, and when the required depth of thread is obtained the core becomes cylindrical, or nearly so, as at *e*, and continues so to within a short distance of the point, where it changes to the conical form *f*, ending in a point. At the junction of the cylindrical part with the conical point the cylindrical gradually runs into the conical part, instead of joining the one abruptly with the other, presenting in section a slightly curved line. The threads on the conical point is gradually reduced until it is finally lost in the conical point, but the same distances between the several convolutions of the thread is maintained along the entire length from where it begins at the shank to where it ends at the apex of the conical point, so that for every turn of the screw each convolution of the thread along the entire length will tend to advance the screw through the same distance.

A screw thus formed will present the following advantages: First, as the power for inserting a screw is applied at the head and the resistance is presented to the threaded part, and the resistance gradually increases, as must also the power applied in proportion as the threaded part advances into the wood, it follows that the greatest strength to resistance is required where the thread begins on the shank, and by making the core a gradual curve for some distance with the thread developed thereon of a gradually increasing depth, the core will present more strength than if the core is cut down between the several convolutions to a parallel line with the axis; and in addition to the better disposition of the metal for strength, the conical form of the core will be more readily drawn into the wood by the thread than if the core be made in echelon; and, second, the point being composed of a conical core with the convolutions of the thread on it in the form of a spiral gradually decreasing in depth and finally merged in the apex of the conical core, but with the convolutions at equal distances apart, and the same distance apart as on the body of the screw, the point of the screw wherever applied and turned will at once enter and travel in the line of its axis, each convolution in succession, as it takes into the wood, giving aid to force the core into the wood, the conical point acting wedge-like to spread apart the wood gradually for the cylindrical core; and this form of point also presents the metal in the best condition to resist the action of the cutter in cutting the thread and forming the pointed core.

It is not intended by the foregoing to limit the claim of invention to a precise geometrical form, as that would be too difficult to attain in the practiced manufacture of wood-screws.

What is claimed as the invention of the said THOMAS J. SLOAN, in the manufacture of wood-screws is—

1. Making the core with a conical point, substantially as described, in combination with the body of a cylindrical form, or nearly so, substantially as and for the purpose specified.

2. Making the core with a conical point, substantially as described, in combination with the thread formed on such conical point of a gradually less depth as it approaches the apex of the core, and with the several convolutions on the conical point and on the body at equal distances apart, substantially as and for the purpose specified.

3. Making wood-screws with the core of a conical shape along that part of the length of the screw extending from where the thread begins on the shank to where it becomes of full depth, substantially as and for the purpose specified.

4. Making wood-screws with the core of a cylindrical or nearly cylindrical form, and with a conical point, in combination with the thread of equal pitch along the conical point and body—that is, with all the convolutions at equal distances apart and of gradually less depth from the base to the apex of the core, substantially as described.

EAGLE SCREW COMPANY, [L.S.]
Per WM. G. ANGELL,
*Agent.*

Witnesses:
WM. H. BISHOP,
ANDREW DE LACY.